United States Patent
Sato

[19]

[11] Patent Number: 6,130,884
[45] Date of Patent: Oct. 10, 2000

[54] VARIABLE RATE CDMA SPREAD CIRCUIT

[75] Inventor: Toshifumi Sato, Tokyo, Japan

[73] Assignee: NEC Corporation, Tokyo, Japan

[21] Appl. No.: 08/985,050

[22] Filed: Dec. 4, 1997

[30] Foreign Application Priority Data

Dec. 5, 1996 [JP] Japan ................................. 8-324897

[51] Int. Cl.$^7$ ............................................... H04B 7/216
[52] U.S. Cl. .......................................... 370/335; 370/468
[58] Field of Search ..................................... 370/335, 342, 370/465, 468; 375/200, 206, 140, 146

[56] References Cited

U.S. PATENT DOCUMENTS

| | | | |
|---|---|---|---|
| 5,442,625 | 8/1995 | Gitlin et al. | 370/342 |
| 5,583,851 | 12/1996 | Kato et al. | 370/342 |
| 5,615,209 | 3/1997 | Bottomley | 370/342 |
| 5,734,648 | 3/1998 | Adachi | 370/342 |
| 5,751,761 | 5/1998 | Guilhousen | 375/200 |
| 5,914,943 | 6/1999 | Higuchi et al. | 370/320 |
| 5,930,244 | 7/1999 | Ariyoshi et al. | 370/335 |
| 5,987,014 | 11/1999 | Magill et al. | 370/335 |

FOREIGN PATENT DOCUMENTS

| | | |
|---|---|---|
| 7-177569 | 7/1959 | Japan . |
| 6-501349 | 2/1994 | Japan . |
| 6-237214 | 8/1994 | Japan . |
| 9-18449 | 1/1997 | Japan . |
| 9-18450 | 1/1997 | Japan . |
| 92 00639 | 1/1992 | WIPO . |

*Primary Examiner*—Chau Nguyen
*Assistant Examiner*—Suibel M. H. Schuppner
*Attorney, Agent, or Firm*—Ostrolenk, Faber, Gerb & Soffen, LLP

[57] ABSTRACT

The invention provides a variable rate CDMA spread circuit which can obtain a sufficient number of spread codes (i.e., channels) orthogonal to each other in a mobile communication system which employs the CDMA scheme and has a plurality of channels of different bit rates. The variable rate CDMA spread circuit includes channel transmission processing units. An adder adds transmission signals output from the plurality of channel transmission processing units. A spread code generator generates a spread code (long code) having a long period and assigned in units of base stations. A spreader spreads the synthesized transmission signal with the spread code (long code). A modulator modulates the transmission signal spread by the spread means to convert it into a radio signal and outputs the radio signal to an antenna.

9 Claims, 4 Drawing Sheets

FIG. 2
CHANNEL #1 (BASIC RATE)
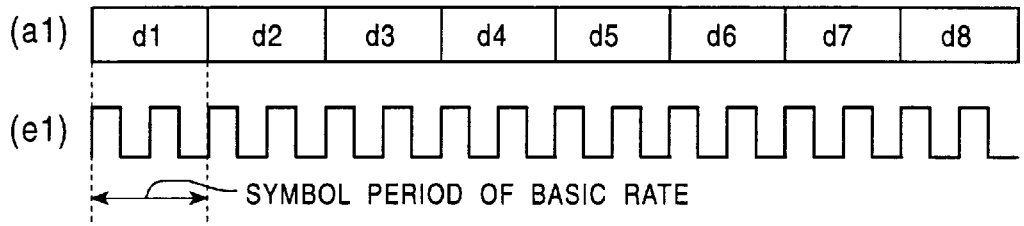
CHANNEL #2 (1/4 OF BASIC RATE)
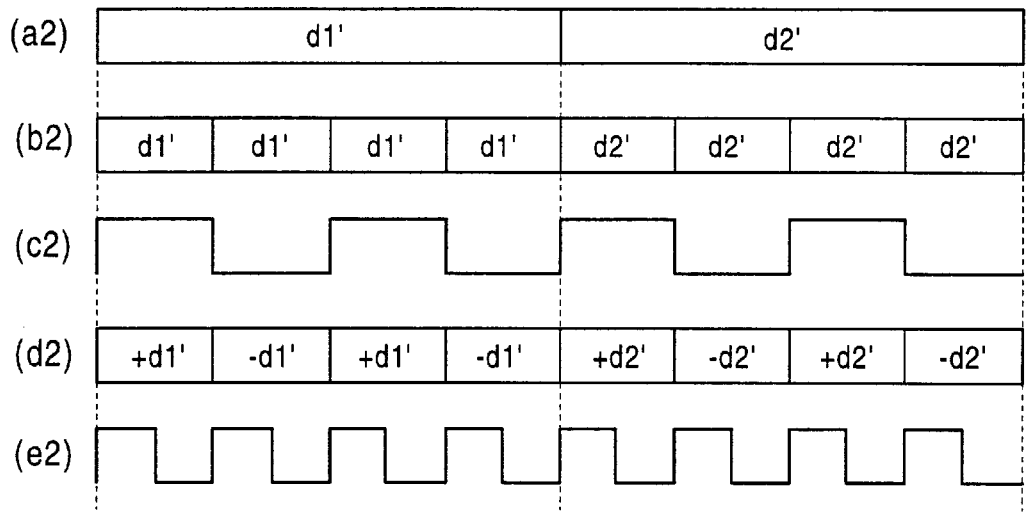
CHANNEL #3 (1/4 OF BASIC RATE)
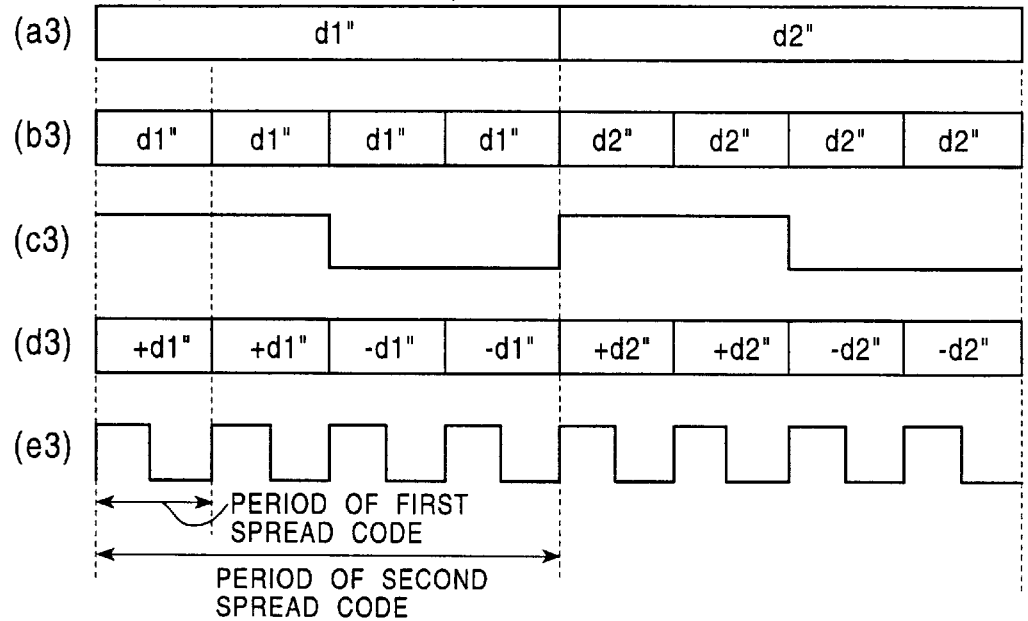

FIG. 4A   CHANNEL #1 (BASIC RATE)

FIRST SPREAD CODE = SYNTHESIZED SPREAD CODE : | C1 |

FIG. 4B   CHANNEL #2 (1/2 RATE)

FIRST SPREAD CODE: | C2 | C2 |

SECOND SPREAD CODE: | +1 | +1 |

SYNTHESIZED SPREAD CODE: | C2 | C2 |

FIG. 4C   CHANNEL #3 (1/4 RATE)

FIRST SPREAD CODE: | C2 | C2 | C2 | C2 |

SECOND SPREAD CODE: | +1 | −1 | +1 | −1 |

SYNTHESIZED SPREAD CODE: | +C2 | −C2 | +C2 | −C2 |

FIG. 4D   CHANNEL #4 (1/4 RATE)

FIRST SPREAD CODE: | C2 | C2 | C2 | C2 |

SECOND SPREAD CODE: | +1 | −1 | −1 | +1 |

SYNTHESIZED SPREAD CODE: | +C2 | −C2 | −C2 | +C2 |

VARIABLE RATE CDMA SPREAD CIRCUIT

BACKGROUND OF THE INVENTION

1. Field of the Invention

The present invention relates to a mobile communication system and particularly to a variable rate CDMA spread circuit in a mobile phone or a cellular phone system (cellular system) using the direct spread code division multiple access (DS-CDMA) scheme, and more particularly, to a variable rate CDMA spread circuit in the transmission unit of a base station of a mobile communication system such as a multimedia service having a plurality of bit rate channels.

2. Description of the Prior Art

In conventional mobile communication systems, the North American standard system (TIA IS95) is known as a digital mobile phone or a cellular phone system (cellular system) using the code division multiple access (CDMA) scheme. The standard specifications TIA/EIA/IS-95-A published by TIA (Telecommunication Industry Association) describes in Chapter 6 an operation required of a mobile station, and describes in Chapter 7 thereof an operation required of a base station.

In a forward link (down channel: from base station to mobile station) based on IS-95, one of four bit rates, 9.6 kbps, 4.8 kbps, 2.4 kbps, and 1.2 kbps, can be selected to transmit/receive data. The basic rate is 9.6 kbps. When data is to be transmitted at a bit rate corresponding to ½, ¼, or ⅛ the basic rate, data is repeatedly transmitted two, four or eight times to realize a variable rate transfer. When data is to be repeatedly transmitted two, four or eight times, the transmission power of each transmission is set to be ½, ¼, or ⅛ of the basic power to respectively obtain constant transmission power per information bit. For the spread codes of the prior art, spread codes corresponding to the basic rate are used regardless of the bit rate being transmitted for the channel. More specifically, only 64 spread codes, limited by the spread rate of the basic rate, can be used per carriers independently of the bit rate.

In methods of transmitting/receiving a plurality of channels of different bit rates, methods disclosed in Japanese Unexamined Patent Publication Nos. HEI 7-177569 and HEI 6-237214 are known in which code division multiple access (CDMA) and time division multiple access (TDMA) are combined to change the number of time slots to be used in accordance with the bit rate. However, in this method using a combination of CDMA and TDMA, the range of bit rates which can be easily realized is limited by the number of time slots. When the number of time slots to be used is reduced to perform intermittent transmission, the transmission power control interval which is essential for CDMA becomes long and increases the transmission power control error. In addition, the interleave effect decreases. Furthermore, since the transmission/reception timings must be matched for all channels, the flexibility is poor.

In a system in which the voice service is mainly provided and the bit rate is lowered only in a silent section, as in IS-95, the prior arts pose no problem. However, a problem occurs in a multimedia service, where signals such as voice data, image data, and other data have bit rates for transmission which are different and simultaneously existent. If the spread codes of the basic rate are assigned to a channel which requires only a low rate, there is a problem that the spread codes are insufficient. For example, from the viewpoint of the usage of a radio band, a channel using only 1.2 kbps can accommodate, in one carrier, the eight-time channel of 9.6 kbps. However, only a two- or three-time channel can be assigned because sufficient spread codes cannot be assigned.

When a number of channels having bit rates lower than the basic rate are present in a CDMA system having a plurality of bit rates together, and the spread codes (short codes) for one basic rate are assigned to all the channels, the number of spread codes (i.e., number of channels) which are orthogonal to each other is few and the frequencies cannot be efficiently used.

SUMMARY OF THE INVENTION

It is an object of the present invention to provide a variable rate CDMA spread circuit capable of obtaining a sufficient number of spread codes (i.e. channels) orthogonal to each other when a plurality of channels of different bit rates are existent in a mobile communication system which employs the CDMA scheme.

It is another object of the present invention to decrease interference by obtaining a sufficient number of channels which are orthogonal to each other, thereby efficiently using the frequencies.

A variable rate CDMA spread circuit according to the present invention comprises N channel transmission processing units, an addition/combine means for adding/combining transmission signals output from the plurality of channel transmission processing units, a third spread code generation means for generating a spread code (long code) having a long period and assigned in units of base stations, a third spread means for spreading the synthesized transmission signal in accordance with the spread code (long code), and a modulation means for modulating the transmission signal spread by the third spread means to convert it into a radio signal and to output the radio signal to an antenna.

In each of the channel transmission processing units, a convolutional coding means convolution codes the transmission data. When the bit rate is lower than the basic rate, a symbol repeating means repeatedly outputs one code to make the bit rate match the basic rate. A first spread code generation means generates a spread code (short code) corresponding to the code number of the basic rate and having a period equal to the symbol length, as in the prior art. A second spread code generation means generates a second spread code corresponding to a subcode number for discriminating a plurality of channels whose maximum bit rates are always lower than the basic rate. A second spread means spreads the symbol which has been repeated to make the bit rate match the basic rate, in accordance with the second spread code corresponding to the subcode number. A block interleaving means performs block interleaving to randomize the influence of degradation in quality due to fading in the propagation path. A first spread means spreads the transmission data in accordance with the first spread code (short code) corresponding to the code number of the basic rate and outputs the data.

As shown in FIG. 1, in the channel of a bit rate lower than the basic rate, spread codes (short codes) for one basic rate can be shared by a plurality of low bit rate channels by repeating the symbol to make the symbol rate equal to the basic rate and spreading the data in accordance with subcodes orthogonal to each other and having a code length equal to the number of times of symbol repetition. These spread channels are orthogonal to each other independently of the bit rate, so interference therebetween can be minimized as far as no distortion is generated in the propagation path.

BRIEF DESCRIPTION OF THE DRAWINGS

FIG. 2 is a timing chart showing the timings of spread means in the first embodiment of the present invention;

FIGS. 4A to 4D are views showing a method of generating a synthesized spread code in the second embodiment of the present invention.

DETAILED DESCRIPTION OF THE PREFERRED EMBODIMENTS

The present invention will now be described with reference to the accompanying drawings.

Figure 1:
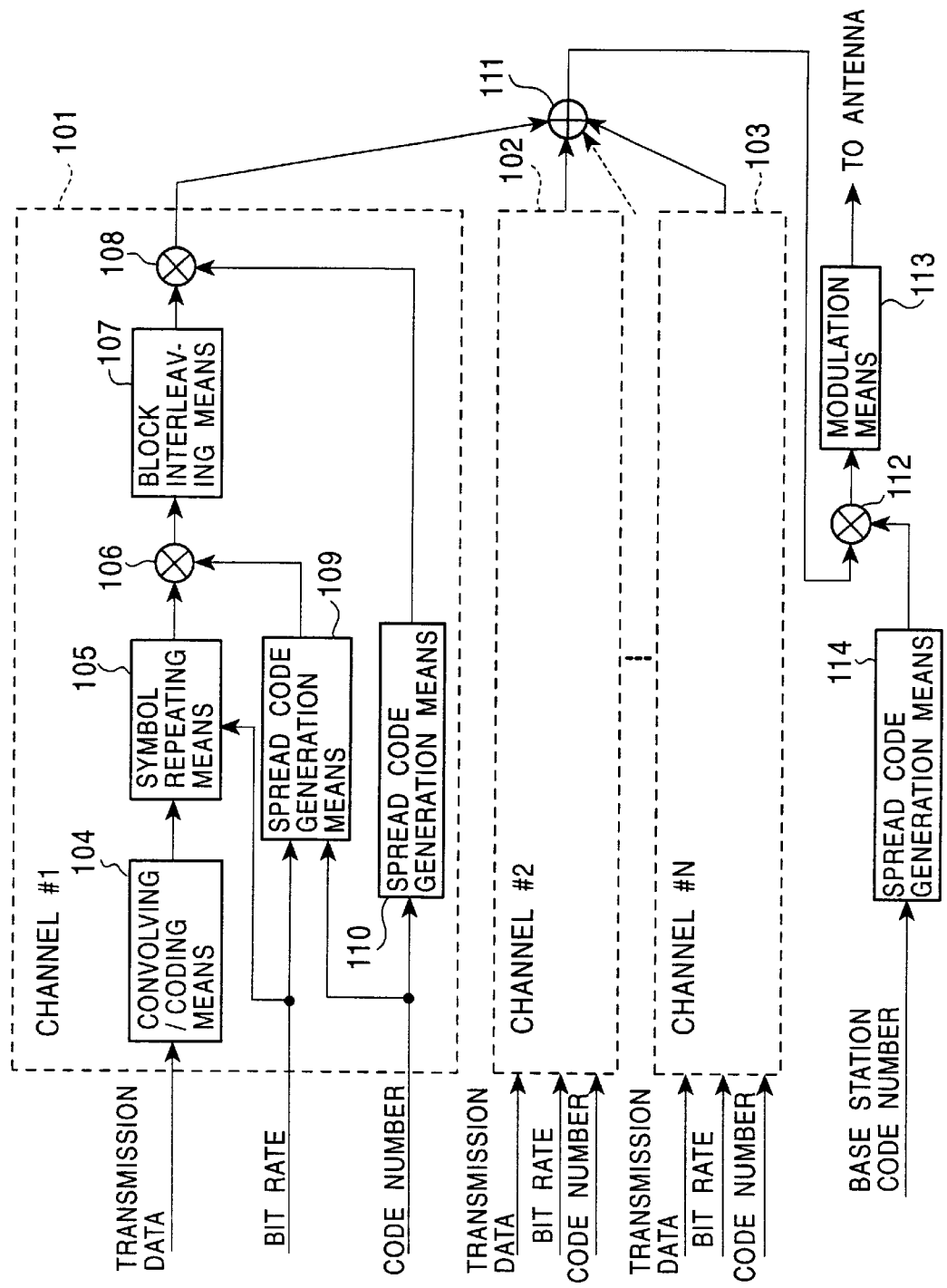
FIG. 1 is a block diagram showing the first embodiment of the present invention.

FIG. 1 is a block diagram showing the first embodiment of the present invention.

Referring to FIG. 1, a variable rate CDMA spread circuit of the present invention comprises N channel transmission processing units 101 to 103. An addition/combine means 111 adds/combines the transmission signals output from the plurality of channel transmission processing units 101 to 103. A spread code generation means 114 generates a third spread code (long code) having a long period and assigned in units of base stations. A spread means 112 spreads the transmission signal synthesized by the addition/combine means 111 in accordance with the third spread code (long code). A modulation means 113 modulates the spread transmission signal to convert it into a radio signal and outputs the radio signal to an antenna.

Each of the channel transmission processing units 101 to 103 comprises a convolutional coding means 104 for convolutional coding transmission data. A symbol repeating means 105 which, when the bit rate is lower than the basic rate, repeats data to make the bit rate match the basic rate. A first spread code generation means 110 generates a first spread code (short code) corresponding to the code number of the basic rate and having a period equal to the symbol length. A second, a spread code generation means 109 generates a second spread code (subcode) corresponding to a subcode number for discriminating a plurality of channels whose maximum bit rates are always lower than the basic rate. A spread means 106 spreads the symbol which has been repeated to make the bit rate match the basic rate. In accordance with the second spread code corresponding to the subcode number, a block interleaving means 107 for randomizes the influence of degradation in quality due to fading in the propagation path to improve the error correction effect. A spread means 108 spreads the transmission data in accordance with the first spread code (short code) corresponding to the code number of the basic rate and outputs the data from the channel transmission processing unit.

Any codes can be used as the first spread code (short code) generated by the channel transmission processing unit 101 and the second spread code (subcode) generated by the spread code generation means 109 as far as they are orthogonal to each other. When Walsh codes used in IS-95 are used, the orthogonal codes can be easily generated. Orthogonal Gold codes have excellent autocorrelation characteristics and are capable of generating a plurality of code sets which may be used as short codes.

The operation of the first embodiment of the present invention will now be described with reference to the accompanying drawings.

FIG. 2 is a timing chart showing the timings of the spread means 106 and 108 in the first embodiment of the present invention.

In FIG. 2, (a1), (a2), and (a3) respectively represent transmission data of channels #1 to #3 after being subject to convolutional coding processing; (b2) and (b3), transmission data of channels #2 and #3, respectively, after being subject to data repeating; and (c2) and (c3), second spread codes of channels #2 and #3, respectively; (d2) and (d3), data of channels #2 and #3, respectively, after being subject to spread processing by the second spread means; and (e1), (e2), and (e3), first spread codes of channels #1 to #3, respectively.

Channel #1 shows an operation of transmitting data at the basic rate, and channels #2 and #3 show an operation of transmitting data at a bit rate corresponding to ¼ the basic rate. Block interleaving is omitted in this timing chart for the descriptive convenience.

Referring to FIG. 2, the transmission data at the basic rate is spread in accordance with the first spread code (short code; e1) equal to the symbol length, as in the prior art. The symbol repeating means 105 and the spread means 106 directly pass the data without performing any processing. For channels #2 and #3 of a bit rate corresponding to ¼ the basic rate, one symbol is repeated four times by the symbol repeating means 105 to convert the bit rate into the same symbol rate as the basic rate. A subcode (in this example, +1, −1, +1, −1 for channel #2 and +1, +1, −1, −1 for channel #3) equal to the repeating period (4 in this example) is multiplexed.

After block interleaving (not illustrated in this timing chart), channel #1 of the basic rate is spread in accordance with a short code (+1, −1, +1, −1) different from that of the remaining channels although the two channels #2 and #3 of the subrate are spread in accordance with the same short code (+1, +1, −1, −1). It can be easily calculated that the three channels spread in this way are orthogonal to each other.

In the above example, two codes are used as subcodes. However, there are four codes which have a code length of 4 and are orthogonal to each other. For this reason, spread codes which are orthogonal to each other in a number four times the basic rate can be assigned to each channel of a bit rate corresponding to ¼ the basic rate. In a similar manner, M spread codes which are orthogonal to each other can be assigned to a channel of a bit rate corresponding to 1/M (where M is the power of 2) the basic rate.

In the above description, the bit rates of the M subrate channels are equal. However, subrate channels of different bit rates can share one basic rate short code. For example, one channel #1 of the ½ the basic rate and two channels #2 and #3 of the ¼ basic rate can be made orthogonal to each other by assigning the following subcodes to these channels.

The subcode for channel #1 is (+1, −1) because the code length is 2

The subcode for channel #2 is (+1, −1, +1, −1) because the code length is 4

The subcodes for channel #3 is (+1, −1, −1, +1) because the code length is 4

In this manner, when subcodes are to be assigned in the system having a plurality of bit rates, systematization is enabled by using Walsh codes as quadrature codes.

More specifically, let a Walsh code having a code length L (L is the power of 2) be $(W_L)$. Two codes $(W_L, W_L)$ and $(W_L, -W_L)$ are Walsh codes each having a code length 2L. When $(W_L, W_L)$ and $(W_L, -W_L)$ are used in place of the spread code $(W_L)$, two spread codes can be used at a rate ½ that in use of $(W_L)$ as a spread code. It can be easily understood that the spread codes generated in this way are orthogonal to each other and also orthogonal to spread codes having the code length L, other than the original spread code ($W_L$), and spread codes at the ½ rate, which are generated from the spread code ($W_L$).

The second embodiment of the present invention will be described next with reference to the accompanying drawings.

Figure 3:
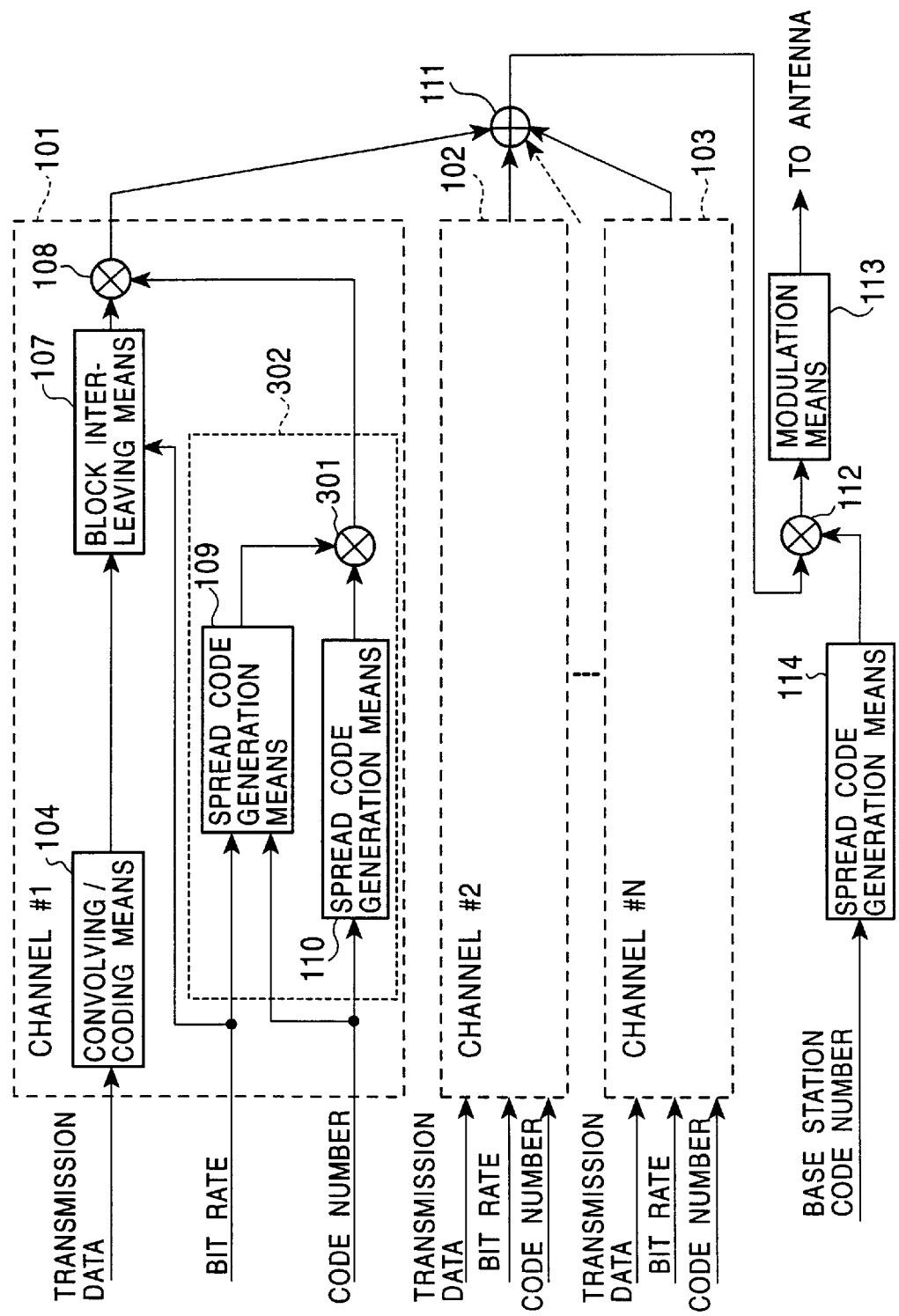
FIG. 3 is a block diagram showing the second embodiment of the present invention.

FIG. 3 is a block diagram showing the second embodiment of the present invention.

The difference between FIG. 3 and FIG. 1 is as follows. The symbol repeating means 105 and the spread means 106 are omitted. A synthesized spread code generation means 302 multiplies the output (first spread code (or short code)) from spread code generation means 110 by the output (second spread code (or subcode)) from spread code generation means 109 to generate a synthesized spread code. Transmission data, after being subject to block interleaving is spread in accordance with this synthesized spread code.

In the first embodiment, after the subrate channel is made equal to the basic rate, block interleaving, is performed. In the second embodiment, however, block interleaving is performed without changing the subrate. For this reason, although the interleaving effect becomes small, a mobile station for exclusively receiving a specific low bit rate can have a simpler arrangement when data is spread and transmitted by the method of the second embodiment.

FIGS. 4A to 4D are views showing generation of the synthesized spread code in the second embodiment.

As shown in FIGS. 4B to 4D, at the ½ or ¼ rate, the first spread code (short code) is repeated in accordance with the second spread code (subcode) to generate a synthesized spread code having a two- or four-time code length. Such a synthesized spread code may be directly generated in accordance with the code number and bit rate. A mobile station for exclusively receiving a specific bit rate can have a simpler arrangement by employing the method of directly generating the synthesized spread code.

When both the short code and the subcode are Walsh codes, the synthesized spread code can be directly generated from the designated code number because the synthesized spread code is also a Walsh code.

The first effect is that even when channels of a plurality of bit rates are present, the data can be spread in accordance with spread codes orthogonal each other, so the interference in the CDMA can be minimized.

The second effect is that even when a large number of channels of low bit rates are present, a sufficient number of codes which are orthogonal to each other can be ensured by assigning subcodes.

What is claimed is:

1. A variable rate CDMA spread circuit in a mobile communication system using direct spread code division multiplex access and having channels which transmit data at a plurality of bit rates, sai a first spread code generator which generates a first spread code at a basic rate, said first spread code being used by all channels in said spread circuit;

second spread code generator which generates second spread codes, each second spread code being unique for each channel in said spread circuit;

wherein subrate channels which transmit data at a subrate corresponding to 1/M of said basic rate, are discriminated from one another by spreading data of said subrate channels in accordance with a respective second spread code which has a code length M; and all of said second spread codes are orthogonal to each other.

2. A variable rate CDMA spread circuit in a mobile communication system using direct spread code division multiplex access and having channels transmitting data at a plurality of bit rates, said a first spread code generator which generates a first spread code at a basic rate;

a second spread code generator which generates second spread codes, each second spread code being unique for each channel in said spread circuit;

wherein data of subrate channels which transmit said data at a bit rate corresponding to 1/M of said basic rate, is spread with a synthesized spread code having a code length of M×R, said synthesized spread code being obtained by multiplying said first spread code which has a code length equal to a spread factor of R times said basic rate, by a respective second spread code which has a code length M; and said synthesized spread codes all being orthogonal to each other.

3. A circuit according to claim 1, wherein said first spread code is an orthogonal Gold code, and said second spread code is a Walsh code.

4. A circuit according to claim 1, wherein said first and second spread code are Walsh codes.

5. A circuit according to claim 2, wherein said first spread code is a Walsh code having a code length R, said second spread code is a Walsh code having a code length M, and said synthesized spread code is a Walsh code having a code length of M×R.

6. The circuit as claimed in claim 1, wherein, for each channel, said circuit comprises:

a respective first spread code generator;

a respective second spread code generator; and a respective spreader which combines an output of said respective first spread code generator and an output of said respective second spread code generator to produce a channel output signal.

7. The circuit as claimed in claim 6 further comprising:

an adder which adds together said channel output signals to produce an output sum;

a third spread code generator which generates a third spread code; and a circuit spreader which combines said third spread code with said output sum.

8. The circuit as claimed in claim 2, wherein, for each channel, said circuit comprises:

a respective first spread code generator;

a respective second spread code generator; and a respective spreader which combines an output of said respective first spread code generator and an output of said respective second spread code generator to produce a channel output signal.

9. The circuit as claimed in claim 8 further comprising:

an adder which adds together said channel output signals to produce an output sum;

a third spread code generator which generates a third spread code; and a circuit spreader which combines said third spread code with said output sum.

* * * * *